(12) United States Patent
Mizuno et al.

(10) Patent No.: US 6,642,501 B2
(45) Date of Patent: Nov. 4, 2003

(54) PHOTO-DETECTING APPARATUS

(75) Inventors: Seiichiro Mizuno, Hamamatsu (JP); Haruhiro Funakoshi, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 39 days.

(21) Appl. No.: 10/044,988

(22) Filed: Jan. 15, 2002

(65) Prior Publication Data

US 2002/0060284 A1 May 23, 2002

Related U.S. Application Data

(63) Continuation-in-part of application No. PCT/JP00/04786, filed on Jul. 17, 2000.

(30) Foreign Application Priority Data

Jul. 16, 1999 (JP) ........................... 1999-203502

(51) Int. Cl.$^7$ ................. H04N 5/335; H04B 10/06; G01J 1/44; H01L 31/10
(52) U.S. Cl. ................. 250/214 R; 250/208.1; 348/297; 356/226
(58) Field of Search ................. 250/214 R, 214 A, 250/214 LA, 208.1, 208.2; 330/308, 309, 59; 348/295, 297; 356/221, 222, 226; 327/514

(56) References Cited

U.S. PATENT DOCUMENTS

| 4,298,259 A | 11/1981 | Aoki et al. ............... 396/127 |
| 5,424,530 A | 6/1995 | Mizuno ................. 250/214 R |
| 5,684,295 A | 11/1997 | Mizuno ................. 250/214 R |
| 5,892,540 A | * 4/1999 | Kozlowski et al. ........ 250/208.1 |
| 6,002,435 A | 12/1999 | Yamamoto et al. ......... 348/307 |
| 6,075,564 A | 6/2000 | Mizuno ................. 348/294 |
| 6,222,175 B1 | * 4/2001 | Krymski ................. 250/208.1 |
| 6,455,837 B2 | * 9/2002 | Mizuno ................. 250/214 R |
| 2002/0029122 A1 | * 3/2002 | Mizuno ................. 702/107 |
| 2002/0060284 A1 | * 5/2002 | Mizuno et al. ........... 250/214 A |

FOREIGN PATENT DOCUMENTS

| EP | 1136798 A1 | * 9/2001 | ............ G01J/1/44 |
| EP | 1158789 A1 | * 11/2001 | .......... H04N/5/335 |
| EP | 1 197 735 A1 | 4/2002 | |
| EP | 1206131 A1 | * 5/2002 | .......... H04N/5/335 |
| GB | 2 269 506 A | 2/1994 | |
| JP | 61-121581 | 6/1986 | |
| JP | 63-90852 | 4/1988 | |
| JP | 6-34670 | 2/1994 | |
| JP | 9-205588 | 8/1997 | |
| JP | 09270961 | 10/1997 | |
| WO | WO 99/46929 | 9/1999 | |

* cited by examiner

Primary Examiner—Diego Gutierrez
Assistant Examiner—Stanley J. Pruchnic, Jr.
(74) Attorney, Agent, or Firm—Morgan, Lewis & Bockius LLP

(57) ABSTRACT

The signal current corresponding to an incident light intensity is output from a photodiode, and the integrating circuit stores an electric charge according to the signal current and outputs a signal voltage corresponding to the amount of the stored electric charge. The first CDS circuit stores in the integrating capacitor an electric charge corresponding to a change in the signal voltage output from the integrating circuit. Similarly, the second circuit stores in the integrating capacitor an electric charge corresponding to a change in the signal voltage output from the integrating circuit. The difference calculation circuit determines a difference between the amount of charge stored in the integrating capacitor of the first CDS circuit and the amount of charge stored in the integrating capacitor of the second CDS circuit, and outputs a signal voltage corresponding to the difference.

3 Claims, 10 Drawing Sheets

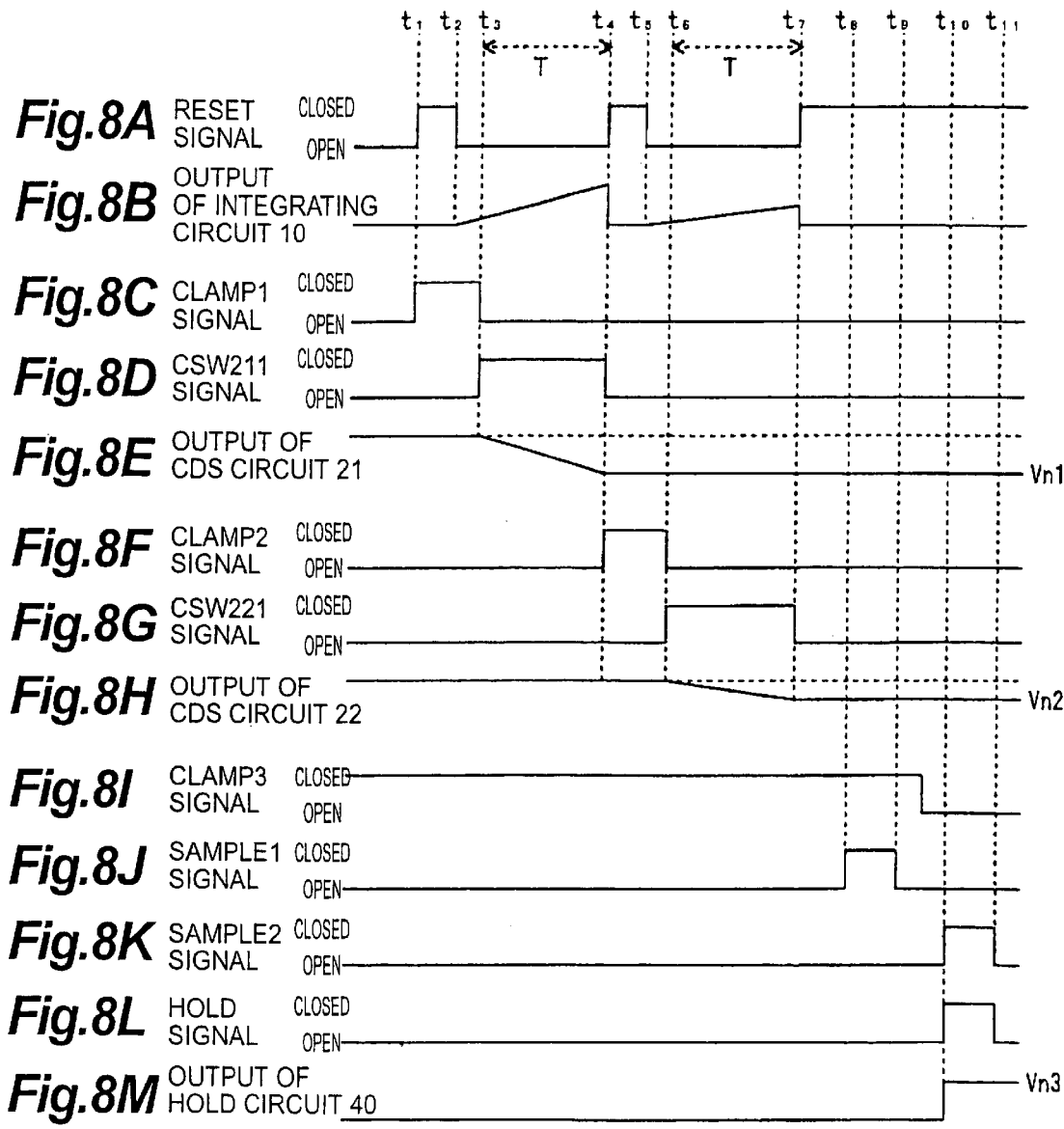

PHOTO-DETECTING APPARATUS

RELATED APPLICATION

This is a continuation-in-part application of application serial no. PCT/JP00/04786 filed on Jul. 17, 2000, now pending.

BACKGROUND OF THE INVENTION

1. Field of the Invention

The present invention relates to a photo-detecting apparatus that removes a background light component of incoming light incident on photodetectors to detect only a signal light component.

2. Related Background Art

The photo-detecting apparatus has one or more photodetectors, and integrates signal currents output from the photodetectors by an integrating circuit and outputs the integrated result as a signal voltage. Some photo-detecting apparatuss convert the signal voltage into a digital signal (A/D conversion) and output the converted digital signal. If the signal voltage exceeds a predetermined value during the A/D conversion, a problem arises that the digital signal which was A/D-converted from the signal voltage is set to a value corresponding to that predetermined value or becomes saturated, failing to perform accurate light detection. To deal with this problem, a conventional practice involves setting the predetermined value to or higher than an estimated maximum value of the signal voltage to prevent the saturation. Another method uses a logarithmic compression technique to expand a dynamic range.

The PHOTO-DETECTING APPARATUS is used in a range sensor installed into a camera, for example. In this range sensor the reflection of a spot light thrown onto an object from a light emitting means such as light emitting diode is detected by two photo-detecting apparatuss that produce two detection signals, based on which the distance to the object is measured. When a spot light component (signal light component) is detected, a background light component superimposed on it is also detected. To cope with this problem, only the background light component is detected when the spot light is not projected, to determine a difference between the two components and obtain a signal of only the spot light component, thereby improving the range-finding precision.

SUMMARY OF THE INVENTION

The integrating circuit in the conventional photo-detecting apparatus, however, is taken no countermeasures against noise components whose magnitudes vary from one integral operation to another, such as thermal noise produced by amplifiers, the constitutional circuits of the integrating circuit. As a result, noise-induced errors may occur. Thus, when the light intensity detected by the photodetectors, i.e., a value of the signal voltage, is small, the noise components that vary from one integral operation to another degrade the S/N ratio of light detection.

Further, in the A/D conversion in the conventional photo-detecting apparatus, because the predetermined value is set to a large value to keep the saturation from taking place, when the light intensity detected by the photodetectors, i.e., the signal voltage, is small, the resolution of the output digital signal deteriorates.

Further, the technique of determining only the spot light component by subtracting the detection result of the background light component from the detection result of both the spot light component and the background light component, as when the photo-detecting apparatus is used in the range sensor, poses the following problem. That is, when the background light component is large compared with the spot light component, the signal voltage of the spot light component superimposed with the background light component is very large, which makes it necessary to set the predetermined value to a still larger value in order to prevent the saturation. Therefore, the digital signal, which is output based on the spot light component obtained as a result of subtraction, makes the resolution even worse.

As described above, the conventional photo-detecting apparatus has a poor S/N ratio and, when the signal voltage is A/D-converted, the resolution of the output digital signal is low. Under these circumstances the present invention has been accomplished to overcome the aforementioned problems and provide a photo-detecting apparatus with an excellent S/N ratio. Another object of this invention is to provide a photo-detecting apparatus which, during the A/D conversion process, does not cause saturation if the incident light intensity is large and provides an excellent resolution if the incident light intensity is small.

The photo-detecting apparatus of this invention comprises: (1) a photodetector to output a signal current corresponding to an incident light intensity; (2) an integrating circuit to store an electric charge corresponding to the signal current output from the photodetector and output a signal voltage corresponding to the amount of stored charge; (3) a first CDS (Correlated Double Sampling) circuit having a first coupling capacitor and a first amplifier both connected serially in that order between its input terminal and output terminal, the input terminal being adapted to receive the signal voltage output from the integrating circuit, a first integrating capacitor parallelly connected between an input and an output of the first amplifier, and a first switch means for storing in the first integrating capacitor an amount of electric charge corresponding to a change in the signal voltage; (4) a second CDS circuit having a second coupling capacitor and a second amplifier both connected serially in that order between its input terminal and output terminal, the input terminal being adapted to receive the signal voltage output from the integrating circuit, a second integrating capacitor having a capacitance value equal to that of the first integrating capacitor and parallelly connected between an input and an output of the first amplifier, and a second switch means for storing in the second integrating capacitor an amount of electric charge corresponding to a change in the signal voltage; and (5) a difference calculation circuit to determine a difference between the amounts of charges stored in the first integrating capacitor of the first CDS circuit and in the second integrating capacitor of the second CDS circuit and output a signal voltage corresponding to the difference.

In this photo-detecting apparatus, a signal current corresponding to an incident light intensity is output from the photodetector, and the integrating circuit stores an electric charge corresponding to the signal current output from the photodetector and outputs a signal voltage corresponding to the amount of the stored electric charge. In the fist CDS circuit, the signal voltage output from the integrating circuit is entered into the first coupling capacitor and the amount of electric charge corresponding to a change in the input signal voltage is stored in the first integrating capacitor by the first switch means. Similarly, in the second CDS circuit, too, the signal voltage output from the integrating circuit is entered into the second coupling capacitor and the amount of electric charge corresponding to a change in the input signal voltage is stored in the second integrating capacitor by the second switch means. Then, the difference calculation circuit determines a difference between the amount of charge stored in the first integrating capacitor of the first CDS circuit and the amount of charge stored in the second integrating capacitor of the second CDS circuit, and outputs a signal voltage corresponding to the difference.

Further, the photo-detecting apparatus of this invention further includes a timing control circuit for controlling the operations of integrating circuit, first CDS circuit, second CDS circuit and difference calculation circuit, and is used along with a light emitting means for throwing a spot light toward an object. In this photo-detecting apparatus the timing control circuit performs the steps of: (1) in a first period when the light emitting means is throwing the spot light onto the object, storing a first amount of electric charge in the first integrating capacitor of the first CDS circuit based on the change in the signal voltage output from the integrating circuit when the photodetector detects the spot light component and a background light component; (2) in a second period when the light emitting means is not throwing the spot light onto the object, storing a second amount of electric charge in the second integrating capacitor of the second CDS circuit based on the change in the signal voltage output from the integrating circuit when the photodetector detects the background light component; and (3) in a third period following the first and second periods, having the difference calculation circuit calculate a difference between the amount of charge stored in the first integrating capacitor of the first CDS circuit and the amount of charge stored in the second integrating capacitor of the second CDS circuit and then output a signal voltage corresponding to the difference from the difference calculation circuit.

In this case, the photo-detecting apparatus under the control of the timing control circuit performs as follows. In the first period, when the photodetector detects the spot light component and the background light component, the first amount of electric charge corresponding to a change in the signal voltage output from the integrating circuit is stored in the first integrating capacitor of the first CDS circuit. In the second period, when the photodetector detects the background light component, the second amount of electric charge corresponding to a change in the signal voltage output from the integrating circuit is stored in the second integrating capacitor of the second CDS circuit. In the third period, the difference calculation circuit determines a difference between the amount of electric charge stored in the first integrating capacitor of the first CDS circuit and the amount of electric charge stored in the second integrating capacitor of the second CDS circuit, and outputs a signal voltage corresponding to the difference. The signal voltage output from this difference calculation circuit corresponds to the spot light component. Either of the first and second periods can occur first.

Further, the photo-detecting apparatus of this invention further includes: (1) N sets (N≧2) of photodetector, integrating circuit, first CDS circuit, second CDS circuit and difference calculation circuit; (2) N hold circuits corresponding to the respective N difference calculation circuits and adapted to hold and output the signal voltages output from the difference calculation circuits; and (3) an A/D converter to successively input the signal voltages output from the N hold circuits, convert the signal voltages into digital signals and output the converted digital signals.

In this case, there are provided N sets of photodetectors, integrating circuit, first CDS circuit, second CDS circuit and difference calculation circuit. The signal voltage output from the difference calculation circuit of each set is held in the hold circuit. Then, the A/D converter successively receives signal voltages from the N hold circuits, converts the signal voltages into digital signals, and outputs the converted digital signals. That is, when a one- or two-dimensional image is photographed, the photographed result is output as the digital signal.

The photo-detecting apparatus of this invention further includes a maximum value detection circuit to detect a maximum value of the signal voltages output from the N difference calculation circuits or the N hold circuits and is characterized in that the A/D converter sets an A/D conversion range according to the maximum value detected by the maximum value detection circuit. In this case, the maximum value detection circuit detects the maximum value of the signal voltages output from the N difference calculation circuits or hold circuits. The A/D converter sets the A/D conversion range according to the maximum value detected by the maximum value detection circuit.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWING

FIGS. 8A, 8B, 8C, 8D, 8E, 8F, 8G, 8H, 8I, 8J, 8K, 8L and 8M are timing charts showing the operations of the photo-detecting apparatus of the embodiment.

DESCRIPTION OF THE PREFERRED EMBODIMENT

Now, embodiments of this invention will be described in detail by referring to the accompanying drawings. Throughout the drawings, identical elements are assigned like reference numbers and repetitive explanations are omitted. It is noted that N is an integer equal to or more than 2 and that a subscript n represent an arbitrary integer from 1 to N, unless otherwise specifically stated.

Figure 1:
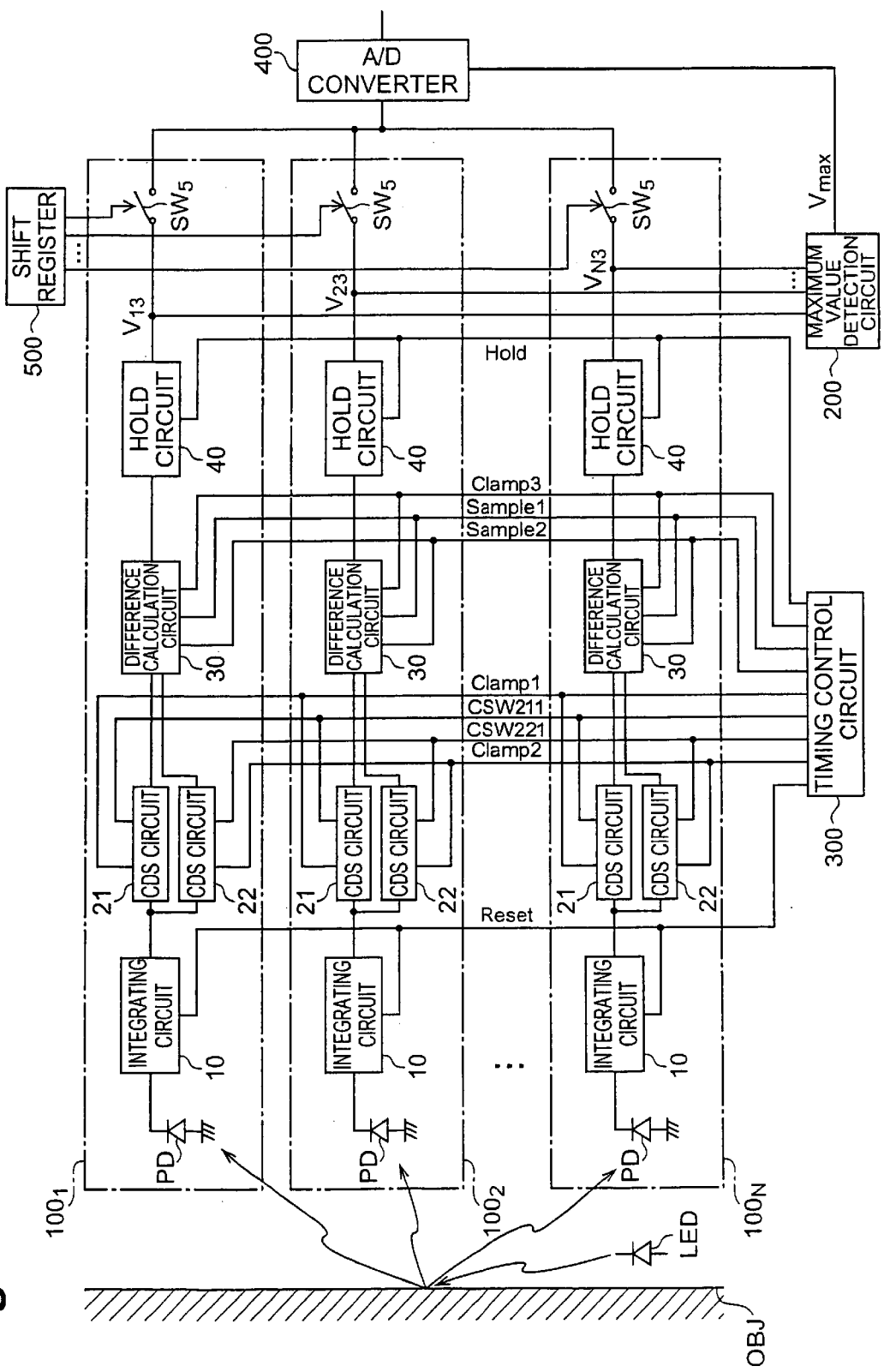
FIG. 1 is an outline configuration diagram showing a photo-detecting apparatus as one embodiment of this invention.

First, the embodiments of the photo-detecting apparatus according to this invention will be explained by referring to FIG. 1 to FIG. 7. FIG. 1 is an outline overall configuration of the photo-detecting apparatus as one embodiment of the invention. The photo-detecting apparatus of this embodiment has N units $100_1$–$100_N$, a maximum value detection circuit 200, a timing control circuit 300, an A/D converter 400, and a shift register 500. Each unit $100_n$ includes a photodiode PD, an integrating circuit 10, a first CDS circuit 21, a second CDS circuit 22, a difference calculation circuit (differential amplifier) 30, a hold circuit 40, and a switch $SW_5$. The integrating circuits 10 in the units $100_n$ are similar in configuration; the first CDS circuits 21 in the units $100_n$ are similar in configuration; the second CDS circuits 22 in the units $100_n$ are similar in configuration; the difference calculation circuits 30 in the units $100_n$ are similar in configuration; and the hold circuits 40 in the units $100_n$ are similar in configuration. Hence, these N units $100_1$–$100_N$ have the similar configurations.

The photodiode PD in each unit $100_n$ has its anode terminal grounded and cathode terminal connected to the input terminal of the integrating circuit 10. The photodiode PD outputs a signal current corresponding to the incoming light intensity from the anode terminal to the input terminal of the integrating circuit 10. The photodiodes PD of the units $100_n$ are arranged one- or two-dimensionally to detect a one- or two-dimensional image.

Figure 2:
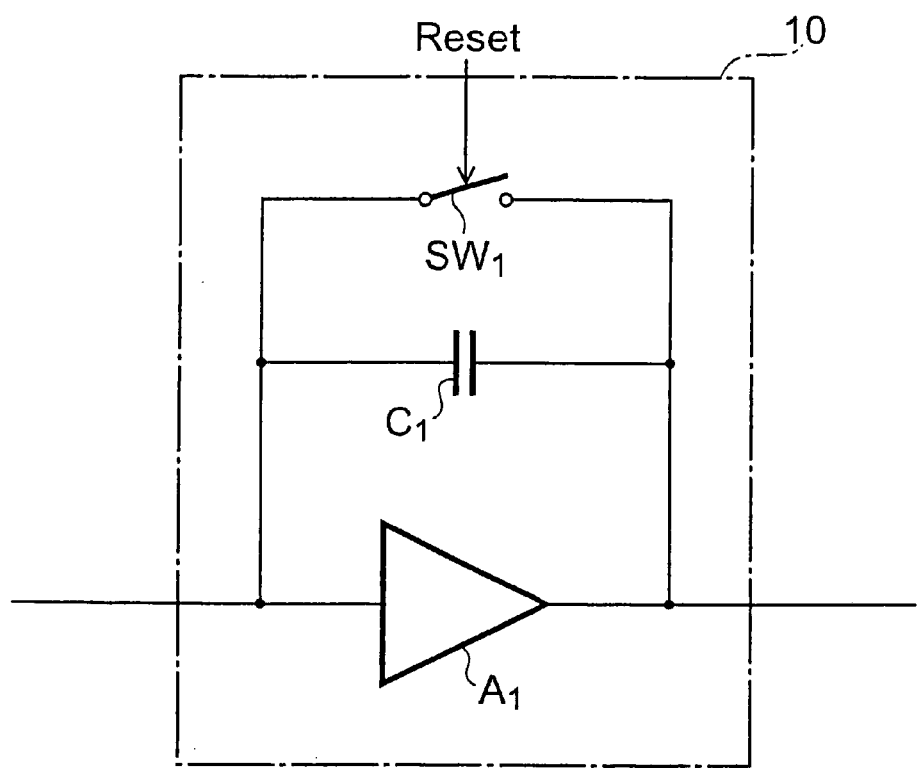
FIG. 2 is a circuit diagram showing an integrating circuit in the photo-detecting apparatus of the embodiment.

FIG. 2 is a circuit diagram of the integrating circuit 10 in the photo-detecting apparatus of this embodiment. The integrating circuit 10 of each unit $100_n$ has an amplifier $A_1$, a capacitor $C_1$ and a switch $SW_1$ parallelly connected between its input terminal and output terminal. When the switch $SW_1$ is closed, the integrating circuit 10 discharges the capacitor $C_1$ for initialization. When the switch $SW_1$ is open, the integrating circuit 10 integrates in the capacitor $C_1$ an electric charge received at the input terminal from the photodiode PD and outputs from its output terminal a signal voltage corresponding to the integrated electric charge. The switch $SW_1$ is opened and closed according to a Reset signal output from the timing control circuit 300.

Figure 3:
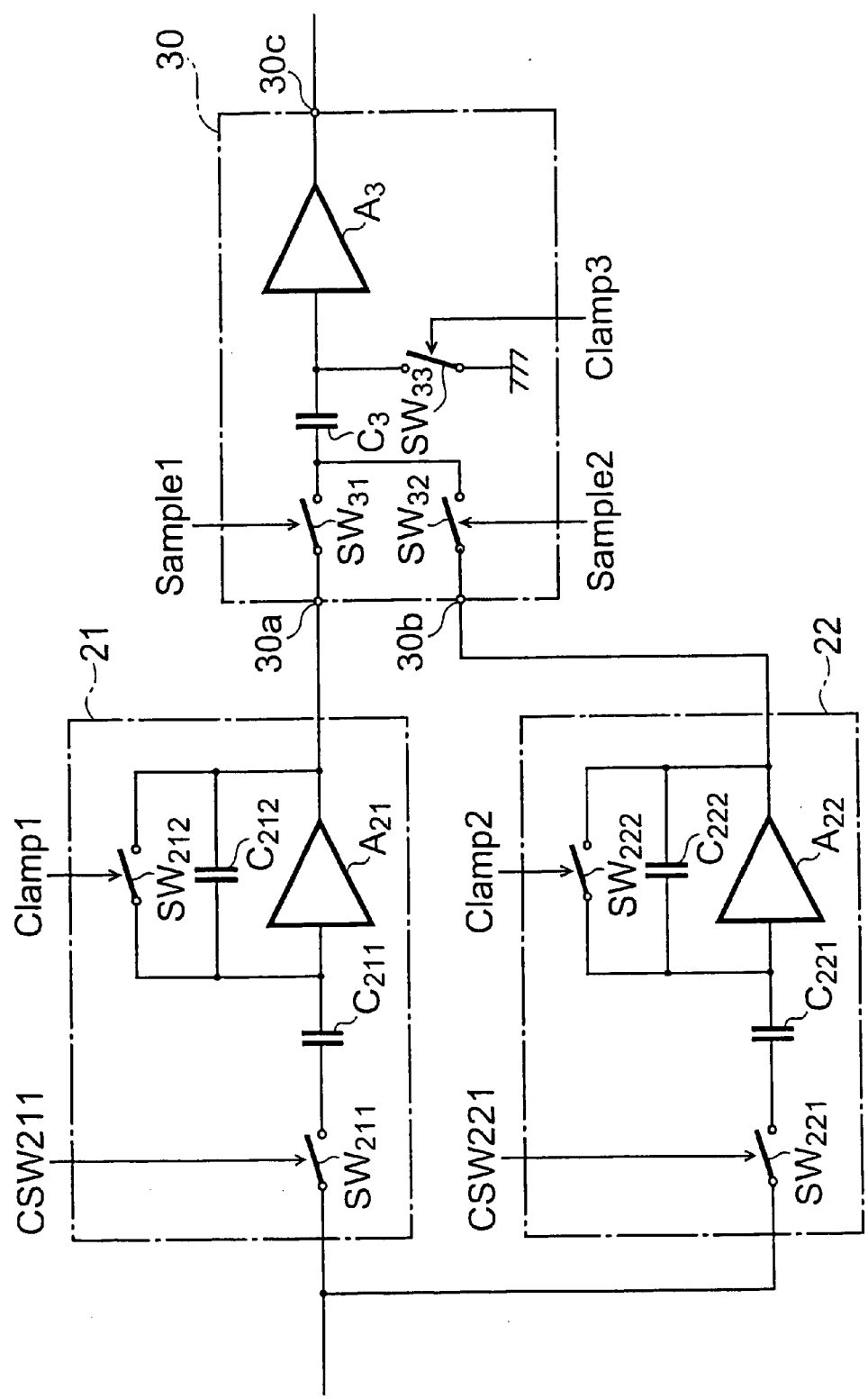
FIG. 3 is a circuit diagram showing a first CDS circuit, a second CDS circuit and a difference calculation circuit in the photo-detecting apparatus of the embodiment.

FIG. 3 is a circuit diagram showing the first CDS circuit 21, the second CDS circuit 22 and the difference calculation circuit 30 in the photo-detecting apparatus of this invention.

The first CDS circuit 21 in each unit $100_n$ has a switch $SW_{211}$, a coupling capacitor $C_{211}$ and an amplifier $A_{21}$ connected in series in that order between the input terminal and the output terminal. A switch $SW_{212}$ and an integrating capacitor $C_{212}$ are parallelly connected between input and output of the amplifier. The switches $SW_{211}$ and $SW_{212}$ work as switch means to integrate an electric charge in the integrating capacitor $C_{212}$. When the switch $SW_{212}$ is closed, the first CDS circuit 21 discharges the integrating capacitor $C_{212}$ for initialization. When the switch $SW_{212}$ is open and the switch $SW_{211}$ is closed, a first electric charge received from the input terminal through the coupling capacitor $C_{211}$ is stored in the integrating capacitor $C_{212}$, and a signal voltage corresponding to the stored charge is outputted from its output terminal. The switch $SW_{211}$ is opened and closed according to a CSW211 signal output from the timing control circuit 300. The switch $SW_{212}$ is opened and closed according to a Clamp1 signal output from the timing control circuit 300.

The second CDS circuit 22 in each unit $100_n$ has a switch $SW_{221}$, a coupling capacitor $C_{221}$ and an amplifier $A_{22}$ connected in series in that order between its input terminal and output terminal. A switch $SW_{222}$ and an integrating capacitor $C_{222}$ are parallelly connected between input and output of the amplifier $A_{22}$. The switches $SW_{221}$ and $SW_{222}$ are act as switch means to store an electric charge in the integrating capacitor $C_{222}$. The capacitance value of the integrating capacitor $C_{222}$ in the second CDS circuit 22 is equal to that of the integrating capacitor $C_{212}$ in the first CDS circuit 21. When the switch $SW_{222}$ is closed, the second CDS circuit 22 discharges the integrating capacitor $C_{222}$ for initialization. When the switch $SW_{222}$ is open and the switch $SW_{221}$ is closed, a second electric charge received from the input terminal through the coupling capacitor $C_{221}$ is stored in the integrating capacitor C222, is outputted and a signal voltage corresponding to the stored charge from the output terminal. The switch $SW_{221}$ is opened and closed according to a CSW221 signal output from the timing control circuit 300. The switch $SW_{222}$ is opened and closed according to a Clamp2 signal output from the timing control circuit 300.

The difference calculation circuit 30 in each unit $100_n$ has two input terminals 30a and 30b and one output terminal 30c, with the first input terminal 30a connected to the output terminal of the first CDS circuit 21 and with the second input terminal 30b connected to the output terminal of the second CDS circuit 22. The difference calculation circuit 30 has switches $SW_{31}$–$SW_{33}$, a capacitor $C_3$ and an amplifier $A_3$. Between the first input terminal 30a and the output terminal 30c, the switch $SW_{31}$, the capacitor $C_3$ and the amplifier $A_3$ are connected in series in that order. Between the second input terminal 30b and the output terminal 30c are serially arranged the switch $SW_{32}$, the capacitor $C_3$ and the amplifier $A_3$ in that order. A junction between the capacitor $C_3$ and the amplifier $A_3$ is grounded through the switch $SW_{33}$.

When the switch $SW_{33}$ is closed and the switch $SW_{32}$ is opened, and the switch $SW_{31}$ is closed for a predetermined duration, the capacitor C3 is received the signal voltage output from the first CDS circuit 21 and charged with a charge Q1. When the switch $SW_{33}$ is opened and the switch $SW_{31}$ is opened, and the switch $SW_{32}$ is closed for a predetermined duration, the capacitor C3 is received the signal voltage output from the second CDS circuit 22 and discharge an electric charge Q2. In this way the difference calculation circuit 30 stores in the capacitor $C_3$ a charge (Q1−Q2), the difference between the charge Q1 and the charge Q2, and outputs a signal voltage corresponding to the stored charge (Q1−Q2) from the amplifier $A_3$. The switch $SW_{31}$ is opened and closed according to a Sample1 signal output from the timing control circuit 300. The switch $SW_{32}$ is opened and closed according to a Sample2 signal output from the timing control circuit 300. The switch $SW_{33}$ is opened and closed according to a Clamp3 signal output from the timing control circuit 300.

Figure 4:
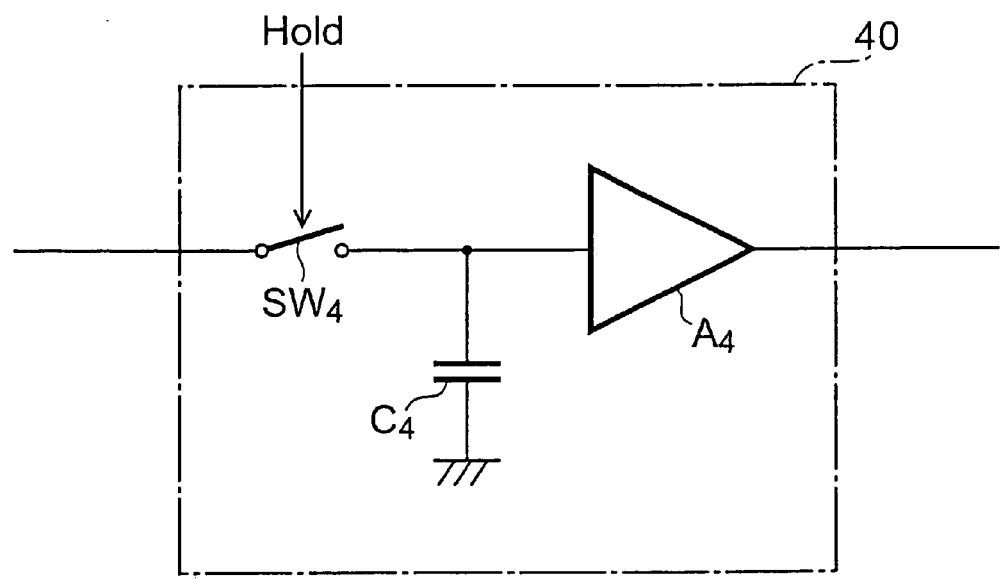
FIG. 4 is a circuit diagram showing a hold circuit in the photo-detecting apparatus of the embodiment.

FIG. 4 is a circuit diagram of the hold circuit 40 in the photo-detecting apparatus of this embodiment. The hold circuit 40 in each unit $100_n$ has a switch $SW_4$ and an amplifier $A_4$ connected in series in that order between the input terminal and the output terminal, with a junction between the switch $SW_4$ and the amplifier $A_4$ grounded through a capacitor $C_4$. When the switch SW4 is closed, the hold circuit 40 stores the signal voltage output from the difference calculation circuit 30 in the capacitor $C_4$ and, even after the switch $SW_4$ is opened, holds the signal voltage in the capacitor $C_4$ for output to the amplifier $A_4$. The switch $SW_4$ is operated according to a Hold signal output from the timing control circuit 300. The switches $SW_5$ in the units $100_n$ are controlled by the shift register 500 so that they are opened successively to enter the signal voltages output from the hold circuits 40 into the A/D converter 400 successively.

Figure 5:
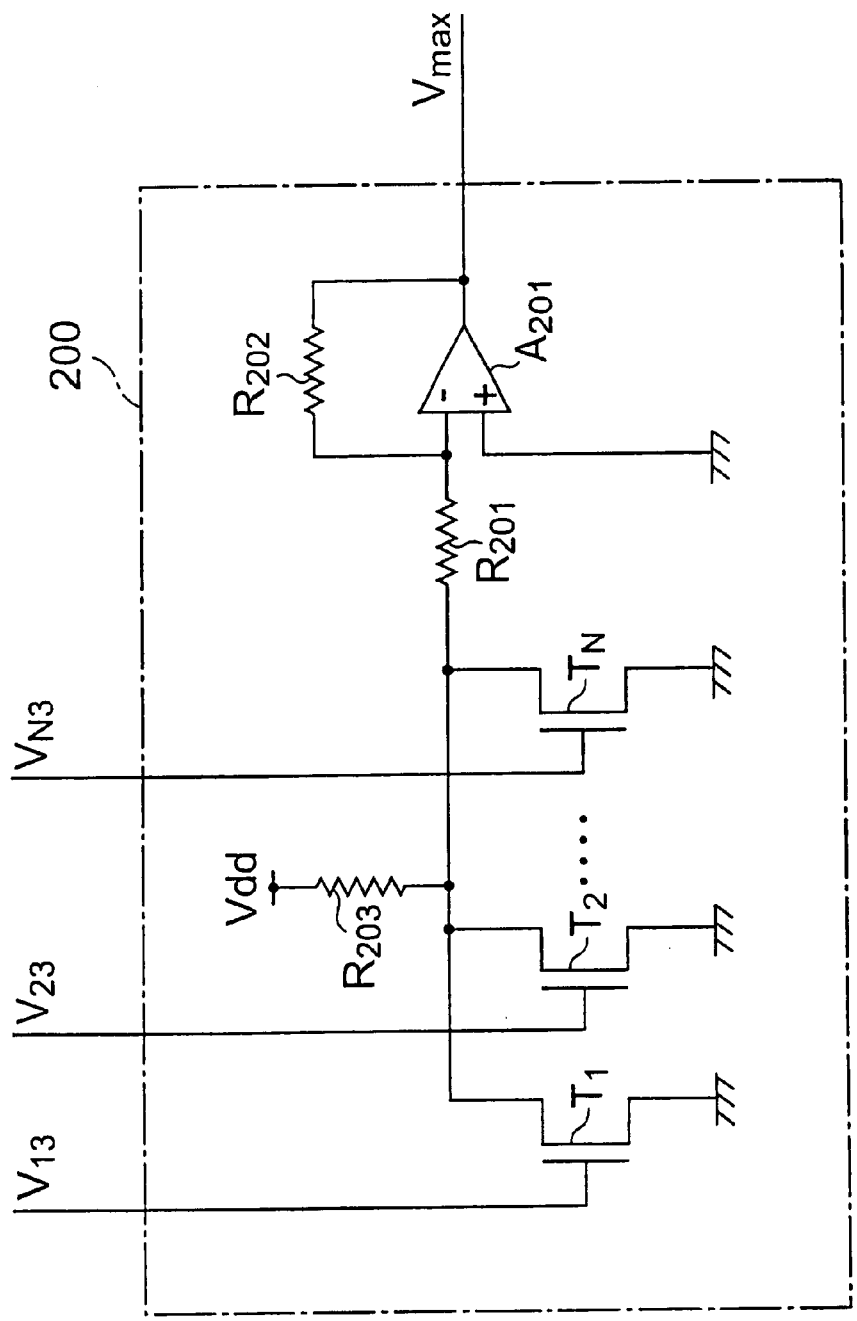
FIG. 5 is a circuit diagram showing a maximum value detection circuit in the photo-detecting apparatus of the embodiment.

FIG. 5 is a circuit diagram of the maximum value detection circuit 200 in the photo-detecting apparatus of this embodiment. The maximum value detection circuit 200 has NMOS transistors $T_1-T_N$, resistors $R_{201}-R_{203}$ and a differential amplifier $A_{201}$. Each transistor $T_n$ has its source grounded and its drain connected to a supply voltage Vdd through a resistor $R_{203}$ and to an inverted input terminal of the differential amplifier $A_{201}$ through the resistor $R_{201}$. A gate of each transistor $T_n$ is connected to the output terminal of the hold circuit 40 of the unit $100_n$ to receive the signal voltage $V_{n3}$ from the hold circuit 40. The differential amplifier $A_{201}$ has a resistor $R_{202}$ connected between its inverted input terminal and output terminal, with the non-inverted input terminal grounded. In this maximum value detection circuit 200, the signal voltage $V_{n3}$ output from the hold circuit 40 is received at the gate of the transistor $T_n$. A potential corresponding to the maximum value of these signal voltages $V_{n3}$ appears at the drain of the transistor $T_n$. Then, the potential of the drain is amplified by the differential amplifier $A_{201}$ at an amplification rate corresponding to the ratio between the resistance values of the resistors $R_{201}$ and $R_{202}$. The amplified voltage value is output as the maximum voltage value $V_{max}$ from the output terminal to the A/D converter 400.

Figure 6:
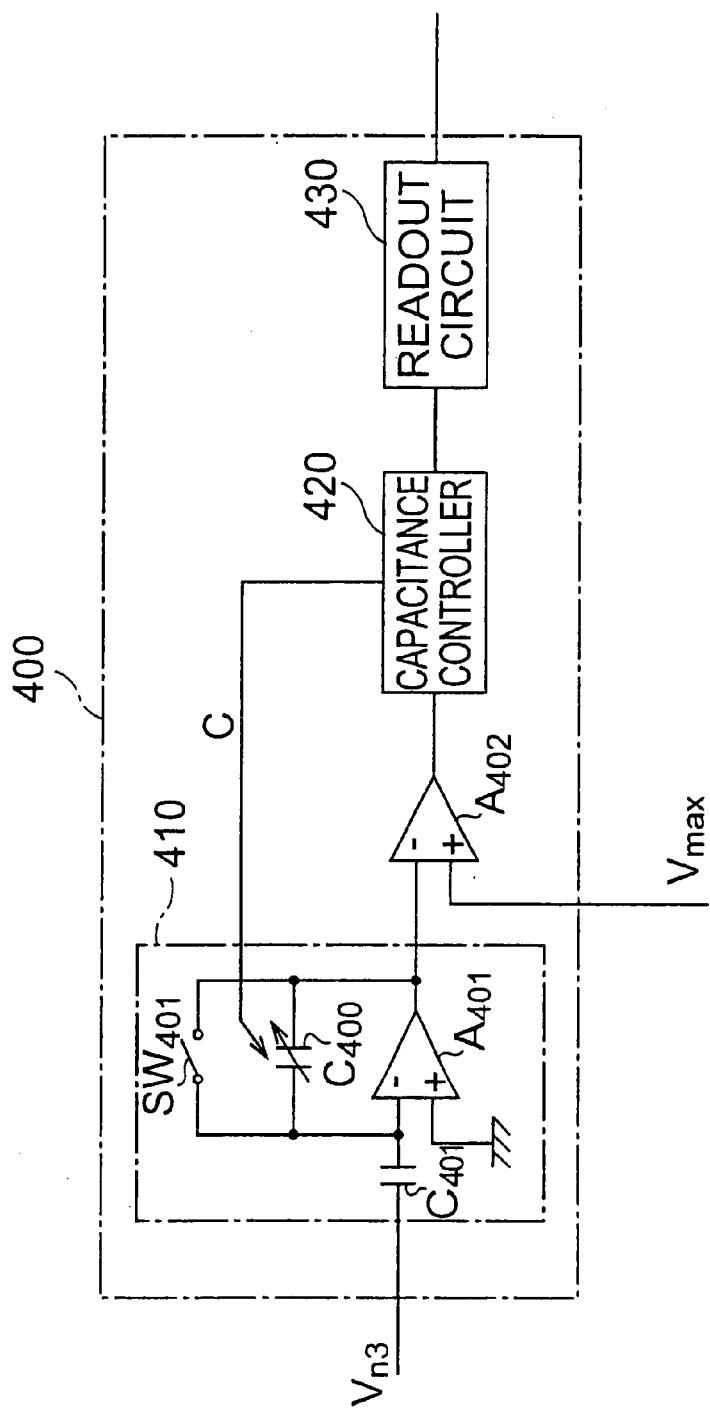
FIG. 6 is a circuit diagram showing an A/D converter in the photo-detecting apparatus of the embodiment.

FIG. 6 is a circuit diagram of the A/D converter 400 in the photo-detecting apparatus of this embodiment. The A/D converter 400 receives the maximum voltage value $V_{max}$ output from the maximum value detection circuit 200 and uses the maximum voltage value $V_{max}$ as the A/D conversion range. The A/D converter 400 receives the signal voltage $V_{n3}$ output from the hold circuit 40 of each unit $100_n$ successively through the switch SW5 and converts the signal voltage (analog signal) into a digital signal before outputting it. The A/D converter 400 has a variable capacitance integrating circuit 410, a comparator $A_{402}$, a capacitance controller 420 and a readout circuit 430.

The variable capacitance integrating circuit 410 has a capacitor $C_{401}$, an amplifier $A_{401}$, a variable capacitor unit $C_{400}$ and a switch $SW_{401}$. The amplifier $A_{401}$ receives at its inverted input terminal through the capacitor $C_{401}$ the signal voltage $V_{n3}$ that was output from the hold circuit 40 of each unit $100_n$ through the switch $SW_5$. The non-inverted input terminal of the amplifier $A_{401}$ is grounded. The variable capacitor unit $C_{400}$ can be variably controlled and is arranged between the inverted input terminal and output terminal of the amplifier $A_{401}$ to integrate an electric charge according to the input signal voltage. The switch $SW_{401}$ is arranged between the inverted input terminal and output terminal of the amplifier $A_{401}$. When the switch $SW_{401}$ is opened, an electric charge is stored in the variable capacitor unit $C_{400}$. When closed, it resets the stored charge of the variable capacitor unit $C_{400}$. The variable capacitance integrating circuit 410 receives the signal voltage $V_{n3}$ successively output from each unit loon, accumulate the charge according to the capacitance of the variable capacitor unit $C_{400}$, and outputs an integrated signal, the result of integration of the signal voltages.

The comparator $A_{402}$ receives the integrated signal output from the variable capacitance integrating circuit 410 at its inverted input terminal and the maximum voltage value $V_{max}$ output from the maximum value detection circuit 200 at its non-inverted input terminal. The comparator $A_{402}$ then compares the values of these two input signals and outputs a comparison result signal, the result of comparison of the input signals.

The capacitance controller 420 receives the comparison result signal output from the comparator $A_{402}$ and, based on the comparison result signal, issues a capacitance specification signal C for controlling the capacitance of the variable capacitor unit $C_{400}$. At the same time, when it decides from this comparison result signal that the values of the integrated signal and the maximum voltage value $V_{max}$ are equal at a predetermined resolution, the capacitance controller 420 outputs a first digital signal according to the capacitance of the variable capacitor unit $C_{400}$.

The readout circuit 430 receives the first digital signal output from the capacitance controller 420 and outputs a second digital signal corresponding to the first digital signal. The second digital signal is equal to an offset value of the variable capacitance integrating circuit 410 subtracted from the first digital signal value. The readout circuit 430 may, for example, be a memory device, which receives the first digital signal as an address and outputs data stored in the memory device at that address as the second digital signal. The second digital signal becomes a light detection signal output from the photo-detecting apparatus of this embodiment.

Figure 7:
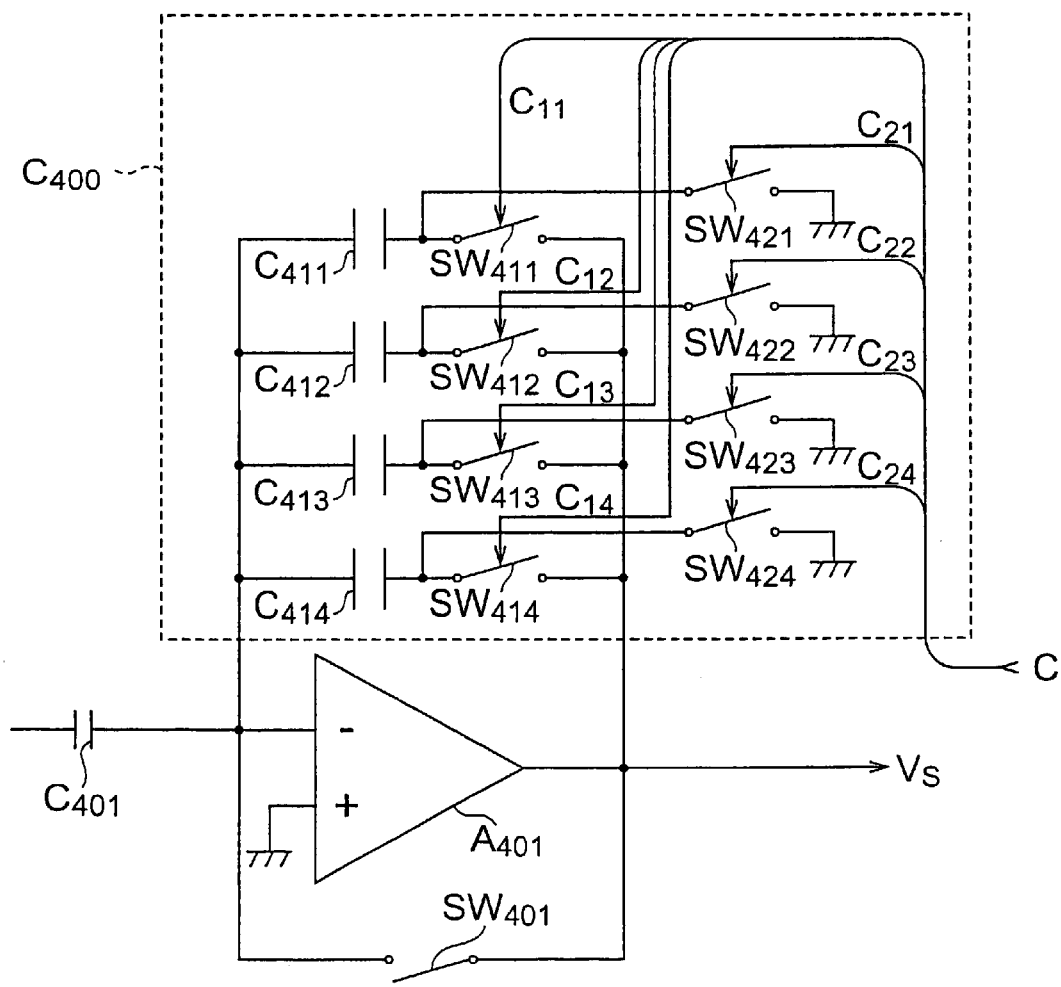
FIG. 7 is a detailed circuit diagram showing a variable capacitance integrating circuit in the A/D converter.

FIG. 7 is a detailed circuit diagram of the variable capacitance integrating circuit 410 in the A/D converter 400. This diagram shows a circuit configuration having an A/D conversion function with a resolution of $\frac{1}{2}^4 = \frac{1}{16}$. In the following this circuit configuration will be explained.

As shown in this figure, the variable capacitor unit $C_{400}$ has capacitors $C_{411}-C_{414}$, switches $SW_{411}-SW_{414}$ and switches $SW_{421}-SW_{424}$.

The capacitor $C_{411}$ and the switch $SW_{411}$ are connected in series between the inverted input terminal and output terminal of the amplifier $A_{401}$, and the switch $SW_{421}$ is arranged between a junction between the capacitor $C_{411}$ and the switch $SW_{411}$ and a ground potential.

The capacitor $C_{412}$ and the switch $SW_{412}$ are connected in series between the inverted input terminal and output terminal of the amplifier $A_{401}$, and the switch $SW_{422}$ is arranged between a junction between the capacitor $C_{412}$ and the switch $SW_{412}$ and a ground potential.

The capacitor $C_{413}$ and the switch $SW_{413}$ are connected in series between the inverted input terminal and output terminal of the amplifier $A_{401}$, and the switch $SW_{423}$ is arranged between a junction between the capacitor $C_{413}$ and the switch $SW_{413}$ and a ground potential.

The capacitor $C_{414}$ and the switch $SW_{414}$ are connected in series between the inverted input terminal and output terminal of the amplifier $A_{401}$, and the switch $SW_{424}$ is arranged between a junction between the capacitor $C_{414}$ and the switch $SW_{414}$ and a ground potential.

The switches $SW_{411}-SW_{414}$ are opened and closed according to the capacitance specification signals C11–C14 output from the capacitance controller 420 of FIG. 6.

The switches $SW_{421}-SW_{424}$ are opened and closed according to the capacitance specification signals C21–C24 output from the capacitance controller 420 of FIG. 6.

If the capacitance values of the capacitors $C_{411}-C_{414}$ are expressed as $C_{411}-C_{414}$, they satisfy the following relations, with $C_0$ taken as a constant.

$$C_{411} = 2C_{412} = 4C_{413} = 8C_{414} \tag{1}$$

$$C_{411} + C_{412} + C_{413} + C_{414} = C_0 \tag{2}$$

Next, the operation of the photo-detecting apparatus of this embodiment will be explained by referring to FIGS. 8A, 8B, 8C, 8D, 8E, 8F, 8G, 8H, 8I, 8J, 8K, 8L and 8M and FIGS. 9A, 9B, 9C and 9D.

FIGS. 8A–8M are timing charts showing the operation of the photo-detecting apparatus of this embodiment. In the following we will explain about a case where the photo-detecting apparatus of this embodiment along with the light emitting means LED such as light emitting diode (see FIG. 1) constitute the range sensor.

That is, the operation described below concerns the process of outputting the light detection signal for only the spot light component (signal light component) thrown from the light emitting diode LED onto an object OBJ after removing the background component.

At time $t_1$, the Reset signal becomes logic H, closing the switch $SW_1$ of the integrating circuit 10 to discharge the capacitor $C_1$ for initialization. At the same time the Clamp1 signal also becomes logic H, closing the switch $SW_{212}$ of the first CDS circuit 21 to stop the CDS operation in the first CDS circuit 21.

At time $t_2$, the Reset signal becomes logic L, opening the switch $SW_1$ of the integrating circuit 10. After time $t_2$, the charge output from the photodiode PD is integrated in the capacitor $C_1$, progressively increasing the signal voltage output from the output terminal of the integrating circuit 10. At this point in time $t_2$, the Clamp1 signal remains high and the switch $SW_{212}$ of the first CDS circuit 21 remains closed. Further, at time $t_2$, the CSW211 signal is low and the switch $SW_{211}$ of the first CDS circuit 21 is open.

At time $t_3$, the Clamp1 signal goes low, opening the switch $SW_{212}$ of the first CDS circuit 21; and the CSW211 signal goes high, closing the switch $SW_{211}$ of the first CDS circuit 21. At time $t_4$, a predetermined length of time T after time $t_3$, the CSW211 signal goes low, opening the switch $SW_{211}$ of the first CDS circuit 21.

In the period between time $t_2$ and time $t_4$, a spot light is thrown from the light emitting diode LED onto the object. Hence, both of the spot light component and the background light component thrown from the light emitting diode LED and reflected from the object OBJ enter into the photodiode PD, which outputs a signal current. Upon receiving the signal current, the integrating circuit 10 integrates an electric charge in the capacitor $C_1$ and outputs a signal voltage corresponding to the amount of charge integrated.

In the period between time $t_3$ and time $t_4$ (first period), the signal voltage output from the output terminal of the integrating circuit 10 enters into the first CDS circuit 21, causing an electric charge corresponding to a change in the input signal voltage after time $t_3$ to be integrated in the integrating capacitor $C_{212}$, thereby outputting a signal voltage corresponding to the amount of integrated charge from the first CDS circuit 21.

Hence, the signal voltage output from the first CDS circuit 21 after the time $t_4$ is a voltage value $V_{n1}$ corresponding to a difference between the signal voltages output from the integrating circuit 10 at time $t_3$ and at time $t_4$ and is removed of a noise component generated in the integrating circuit 10.

At time $t_4$, the Reset signal goes high, closing the switch $SW_1$ of the integrating circuit 10 to discharge the capacitor $C_1$ for initialization. The Clamp2 signal also goes high, closing the switch $SW_{222}$ of the second CDS circuit 22 and stopping the CDS operation of the second CDS circuit 22.

At time $t_5$, the Reset signal goes low, opening the switch $SW_1$. After $t_5$, the electric charge output from the photodiode PD is integrated in the capacitor $C_1$, progressively increasing the signal voltage output from the output terminal of the integrating circuit 10. At time $t_5$, the Clamp2 signal remains high keeping the switch $SW_{222}$ of the second CDS circuit 22 closed. Further, at time $t_5$, the CSW221 signal is low, keeping the switch $SW_{221}$ of the second CDS circuit 22 open.

At time $t_6$, the Clamp2 signal goes low, opening the switch $SW_{222}$ of the second CDS circuit 22, and the CSW221 signal goes high, closing the switch $SW_{221}$ of the second CDS circuit 22. Then, at time $t_7$, a predetermined length of time T after time $t_6$, the CSW221 signal goes low, opening the switch $SW_{221}$ of the second CDS circuit 22.

In the period between time $t_5$ and time $t_7$, the spot light is not projected from the light emitting diode onto the object. Hence, only the background light component enters into the photodiode PD, which then outputs the corresponding signal current. Upon receiving the signal current, the integrating circuit 10 integrates an electric charge in the capacitor $C_1$ and outputs a signal voltage corresponding to the amount of integrated charge. In the period between $t_6$ and $t_7$ (second period), the signal voltage output from the output terminal of the integrating circuit 10 enters into the second CDS circuit 22, causing an electric charge corresponding to a change in the input signal voltage after time $t_6$ to be integrated in the integrating capacitor $C_{222}$, thereby outputting a signal voltage corresponding to the amount of integrated charge from the second CDS circuit 22. Hence, the signal voltage output from the second CDS circuit 22 after the time $t_7$ is a voltage value $V_{n2}$ corresponding to a difference between the signal voltages output from the integrating circuit 10 at time $t_6$ and at time $t_7$ and is removed of a noise component generated in the integrating circuit 10.

After time $t_7$, the electric charge stored in the integrating capacitor $C_{212}$ of the first CDS circuit 21 is equivalent to the sum of the spot light component and the background light component. The electric charge stored in the integrating capacitor $C_{222}$ of the second CDS circuit 22 is equivalent to only the background light component. Because the period $t_3$–$t_4$ (first period) and the period $t_6$–$t_7$ (second period) are equal, T, and because the capacitance of the integrating capacitor $C_{212}$ of the first CDS circuit 21 and the capacitance of the integrating capacitor $C_{222}$ of the second CDS circuit 22 are equal, the voltage value $V_{n1}$ corresponds to the sum of the spot light component and the background light component and the voltage value $V_{n2}$ corresponds to only the background light component. Therefore, the voltage difference $\Delta V_n = (V_{n1} - V_{n2})$ corresponds to only the spot light component. Thus, after time $t_8$, the voltage difference $\Delta V_n$ can be determined by the difference calculation circuit 30 as follows.

After time $t_7$ (third period), the Reset signal is high, closing the switch $SW_1$ of the integrating circuit 10 to discharge the capacitor $C_1$ and maintaining the initialized state. The Clamp1 signal is low, leaving the switch $SW_{212}$ of the first CDS circuit 21 open. The Clamp2 signal is low, leaving the switch $SW_{222}$ open.

In a period $t_8$–$t_9$ of the third period after time $t_7$, the Sample1 signal is high, closing the switch $SW_{31}$ of the difference calculation circuit 30. At this time, the Sample 2 signal is low, opening the switch $SW_{32}$ of the difference calculation circuit 30, and the Clamp3 signal is high, closing the switch $SW_{33}$ of the difference calculation circuit 30. During this period, the voltage value $V_{n1}$ output from the output terminal of the first CDS circuit 21 is entered through the switch $SW_{31}$ of the difference calculation circuit 30 into the capacitor $C_3$ where it is held.

In a period $t_{10}$–$t_{11}$ of the third period after time $t_7$, the Sample2 signal is high, closing the switch $SW_{32}$ of the difference calculation circuit 30. At this time, the Sample1 signal is low, leaving the switch $SW_{31}$ of the difference calculation circuit 30 open, and the Clamp3 signal is low, leaving the switch $SW_{33}$ of the difference calculation circuit 30 open. During this period, the voltage value $V_{n2}$ output from the output terminal of the second CDS circuit 22 is entered through the switch $SW_{32}$ of the difference calculation circuit 30 into the capacitor $C_3$. At this time, because the switch $SW_{33}$ of the difference calculation circuit 30 is open, the capacitor $C_3$ of the difference calculation circuit 30 holds the difference $\Delta V_n$ between the voltage value $V_{n2}$ and the voltage value $V_{n1}$. This voltage difference $\Delta V_n$ corresponds to only the spot light component.

At time $t_{10}$, the Hold signal goes high, closing the switch $SW_4$ of the hold circuit 40 to cause the voltage difference $\Delta V_n$ stored in the capacitor $C_3$ of the difference calculation circuit 30 to be transferred through the amplifier $A_3$ of the difference calculation circuit 30 and the switch $SW_4$ of the hold circuit 40 to the capacitor $C_4$ of the hold circuit 40 where it is held. Even after the Hold signal goes low at time $t_{11}$ opening the switch $SW_4$, the voltage difference $\Delta V_n$ held in the capacitor $C_4$ of the hold circuit 40 is output as the signal voltage $V_{n3}$ from the amplifier $A_4$.

The signal voltage $V_{n3}$ output from the hold circuit 40 of each unit $100_n$ is sent to the maximum value detection circuit 200 which detects the maximum voltage value $V_{max}$. The switch $SW_5$ of each unit $100_n$ is successively closed by the shift register 500, supplying the signal voltage $V_{n3}$ from the hold circuit 40 of each unit $100_n$ to the A/D converter 400.

Next, by referring to FIGS. 9A–9D, the operation of the A/D converter 400 will be explained. At time $t_{11}$, the switch $SW_{401}$ of the variable capacitance integrating circuit 410 is closed to reset the variable capacitance integrating circuit 410. The switches $SW_{411}$–$SW_{414}$ and the switches $SW_{421}$–$SW_{424}$ of the variable capacitance integrating circuit 410 are closed, setting the capacitance of the variable capacitor unit $C_{400}$ to $C_0$.

Then, at one point after time $t_{11}$, the switch $SW_{401}$ of the A/D converter 400 is opened and the switch $SW_5$ of the first unit $100_1$ is closed. The signal voltage $V_{13}$ output from the hold circuit 40 of the first unit $100_1$ is supplied to the variable capacitance integrating circuit 410 of the A/D converter 400 through the switch $SW_5$. When the signal voltage $V_{13}$ enters the capacitance element $C_{401}$ of the variable capacitance integrating circuit 410, an electric charge Q corresponding to the value of the signal voltage $V_{13}$ and to the capacitance value $C_0$ of the variable capacitor unit $C_{400}$ flows into the variable capacitor unit $C_{400}$ (see FIG. 9A) At this time, the integrated signal value $V_{sa}$ output from the variable capacitance integrating circuit 410 is expressed as $$V_{sa}=V_{13}=Q/C_0 \tag{3}$$

Figure 9A:
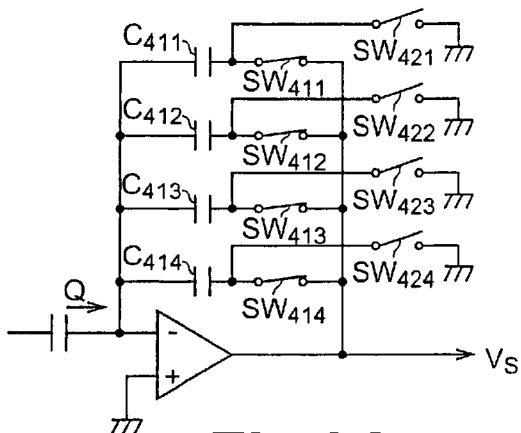
FIGS. 9A, 9B, 9C and 9D are diagrams showing the operations of the A/D converter.
Figure 9B:
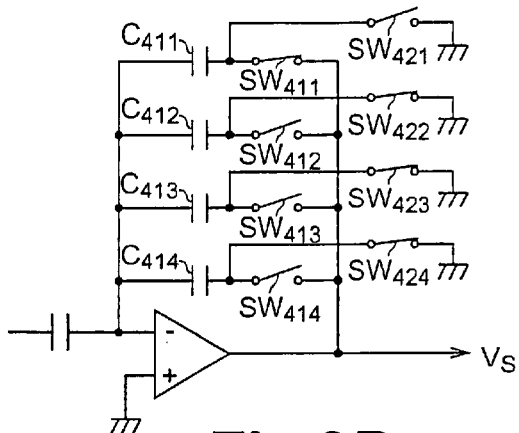

Then, the capacitance controller 420 opens the switches $SW_{412}$–$SW_{414}$ of the variable capacitor unit $C_{400}$ and then closes the switches $SW_{422}$–$SW_{424}$ (see FIG. 9B). As a result, the capacitance value of the variable capacitor unit $C_{400}$ becomes $C_{411}$ and the value $V_{sb}$ of the integrated signal output from the variable capacitance integrating circuit 410 is given by $$V_{sb}=Q/C_{411} \tag{4}$$

This integrated signal is sent to the comparator $A_{402}$ where it is compared with the maximum voltage value $V_{max}$.

Figure 9C:
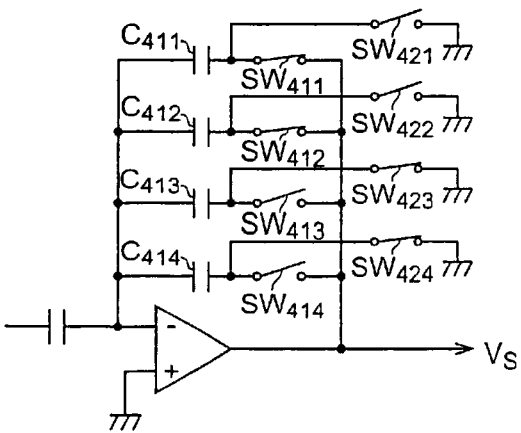

If $V_{sb}>V_{max}$, the capacitance controller 420, based on this comparison result, opens the switch $SW_{422}$ of the variable capacitor unit $C_{400}$ and then closes the switch $SW_{412}$ (see FIG. 9C). As a result, the capacitance value of the variable capacitor unit $C_{400}$ is $C_{411}+C_{412}$ and the integrated signal value $V_{sc}$ output from the variable capacitance integrating circuit 410 will become $$V_{sc}=Q/(C_{411}+C_{412}) \tag{5}$$

The integrated signal is entered to the comparator $A_{402}$ where it is compared with the maximum voltage value $V_{max}$.

Figure 9D:
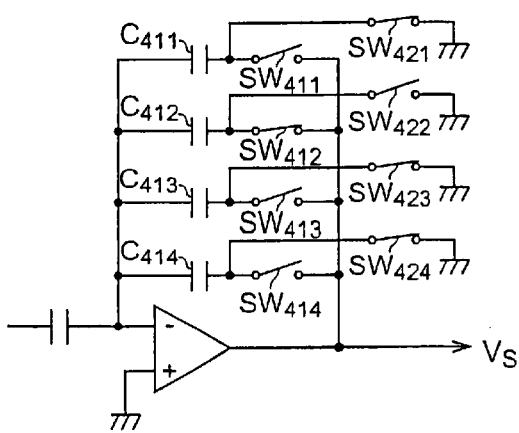

If $V_{sb}<V_{max}$, the capacitance controller 420, based on this comparison result, opens the switches $SW_{411}$ and $SW_{422}$ of the variable capacitor unit $C_{400}$ and then closes the switches $SW_{412}$ and $SW_{421}$ (see FIG. 9D). As a result, the capacitance value of the variable capacitor unit $C_{400}$ is $C_{412}$ and the integrated signal value $V_{sd}$ output from the variable capacitance integrating circuit 410 will be $$V_{sd}=Q/C_{412} \tag{6}$$

The integrated signal is supplied to the comparator $A_{402}$ where it is compared with the maximum voltage value $V_{max}$.

After this, until the capacitance controller 420 decides that the integrated signal value and the maximum voltage value $V_{max}$ agree at a predetermined resolution, the setting of the capacitance value of the variable capacitor unit $C_{400}$ and the comparison between the integrated signal value and the maximum voltage value $V_{max}$ are repeated as described above in a feedback loop of the variable capacitance integrating circuit 410, the comparator $A_{402}$ and the capacitance controller 420. When the capacitance controller 420 finishes the capacitance control on all the capacitors $C_{411}$–$C_{414}$ of the variable capacitor unit $C_{400}$ as described above, it outputs a digital signal corresponding to the final capacitance value of the variable capacitor unit $C_{400}$ to the readout circuit 430.

The readout circuit 430 receives the digital signal from the capacitance controller 420 as an address and outputs a digital data stored in the memory device at that address as a light detection signal of the photo-detecting apparatus of this embodiment. As described above, the signal voltage $V_{13}$ corresponding to the intensity of spot light detected by the photodiode PD of the first unit $100_1$ is converted by the A/D converter 400 into a digital signal, which is then output as a light detection signal. In the similar manner, the signal voltage $V_{n3}$ corresponding to the intensity of spot light detected by the photodiode PD of the second or subsequent unit $100_n$ is converted by the A/D converter 400 into a digital signal, which is then output successively as alight detection signal.

The maximum value among the signal voltages $V_{n3}$ entered into the variable capacitance integrating circuit 410 is the maximum voltage value $V_{max}$ and the maximum capacitance value of the variable capacitor unit $C_{400}$ is $C_0$, so that from the equation (3) the maximum value of the electric charge Q flowing into the variable capacitor unit $C_{400}$ is $V_{max} \cdot C_0$. When an n-th signal voltage $V_{n3}$ is the maximum voltage value $V_{max}$, all the switches $SW_{411}$–$SW_{414}$ of the variable capacitor unit $C_{400}$ are closed, causing the capacitance value of the variable capacitor unit $C_{400}$ to become $C_0$. When on the other hand another n-th signal voltage $V_{n3}$ is smaller than the maximum voltage value $V_{max}$, the electric charge Q flowing into the variable capacitor unit $C_{400}$ is smaller than $V_{max} \cdot C_0$, so that opening one of the switches $SW_{411}$–$SW_{414}$ of the variable capacitor unit $C_{400}$ will make the integrated signal output from the variable capacitance integrating circuit 410 equal to the maximum voltage value $V_{max}$.

As described above, the maximum voltage value $V_{max}$ output from the maximum value detection circuit 200 and entered into the comparator $A_{402}$ defines the maximum value of the signal voltage $V_{n3}$ that can be A/D-converted without saturating the A/D converter 400, i.e., the A/D conversion range. Because one of the signal voltages $V_{n3}$ entered into the A/D converter 400 is the maximum voltage value $V_{max}$, all of the A/D conversion range can be utilized effectively. That is, the optical detector of this embodiment is not saturated even when the incident light intensity is large and has an excellent A/D conversion resolution even when the incident light intensity is small.

In cases where a signal for only the spot light component is determined by subtracting the detection result of the background light component from the detection result of the spot light component and the background light component, as when the photo-detecting apparatus is used in a range sensor, if the background light component is large compared with the spot light component of the light detected by the photodiode PD, the digital signal output from the A/D converter 400 based on the spot light component obtained by the subtraction method has an excellent resolution.

Further, in this embodiment, when the spot light component and the background light component are both detected by the photodiode PD, a signal voltage change $V_{n1}$ output from the integrating circuit 10 in a predetermined period T is held in the integrating capacitor $C_{212}$ of the first CDS circuit 21. When only the background light component is detected by the photodiode PD, a signal voltage change $V_{n2}$ output from the integrating circuit 10 in a predetermined period T is held in the integrating capacitor $C_{222}$ of the second CDS circuit 22. After this, a signal voltage $V_{n3}$ equivalent to the difference between the voltage value $V_{n1}$ and the voltage value $V_{n2}$ is determined by the difference calculation circuit 30 and output to the hold circuit 40. Hence, the voltage value $V_{n1}$ output from the first CDS circuit 21, the voltage value $V_{n2}$ output from the second CDS circuit 22 and the signal voltage $V_{n3}$ output from the hold circuit 40 are all removed of the noise component generated in the integrating circuit 10.

Figure 10:
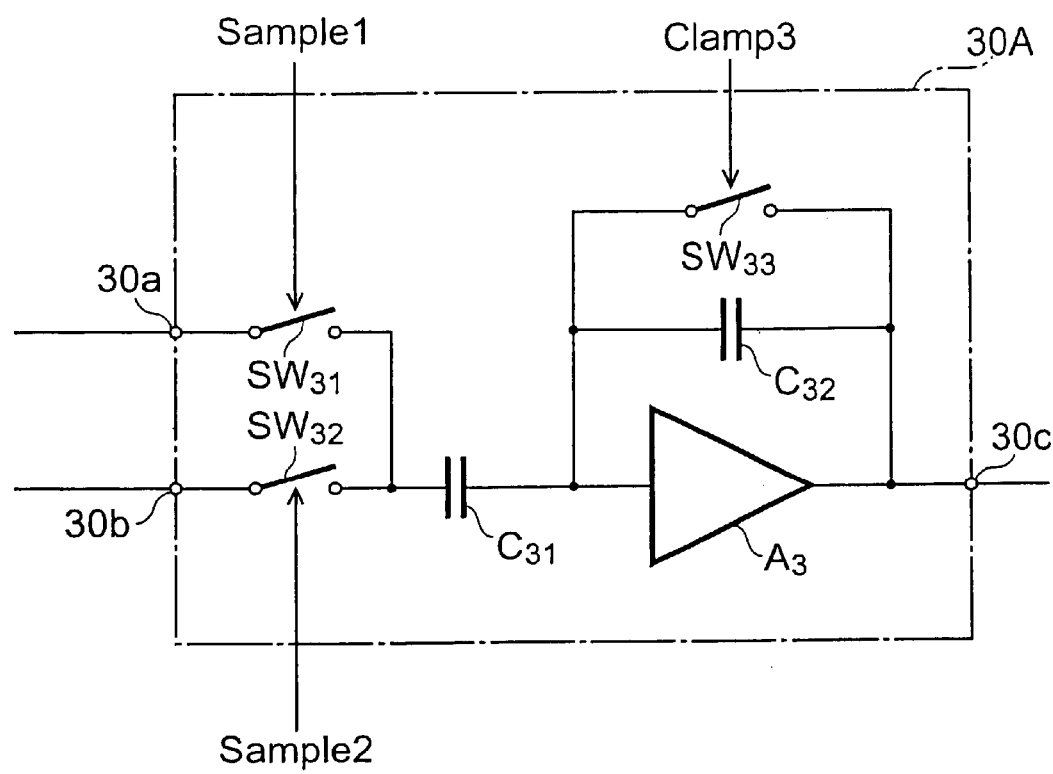
FIG. 10 is a circuit diagram showing the difference calculation circuit in the photo-detecting apparatus according to another embodiment.

Next, another embodiment of the difference calculation circuit in the photo-detecting apparatus according to this invention will be described. FIG. 10 is a circuit diagram of a difference calculation circuit 30A in the photo-detecting apparatus according to another embodiment. The difference calculation circuit 30A is used in place of the difference calculation circuit 30 of FIG. 1. The difference calculation circuit 30A has two input terminals 30a, 30b and one output terminal 30c, with the first input terminal 30a connected to the output terminal of the first CDS circuit 21 and the second input terminal 30b connected to the output terminal of the second CDS circuit 22. The difference calculation circuit 30A has switches $SW_{31}$–$SW_{33}$, capacitors $C_{31}$, $C_{32}$ and an amplifier $A_3$. Between the first input terminal 30a and the output terminal 30c are serially arranged the switch $SW_{31}$, the capacitor $C_{31}$ and the amplifier $A_3$ in that order. Between the second input terminal 30b and the output terminal 30c are serially arranged the switch $SW_{32}$, the capacitor $C_{31}$ and the amplifier $A_3$ in that order. Between the input and output of the amplifier $A_3$, the switch $SW_{33}$ and the capacitor $C_{32}$ are parallelly connected.

The difference calculation circuit 30A shown in FIG. 10 operates almost in the same way as the difference calculation circuit 30 of FIG. 3. That is, when, with the switch $SW_{33}$ open, the switch $SW_{32}$ is opened and the switch $SW_{31}$ is closed for a predetermined duration, the difference calculation circuit 30A receives the signal voltage output from the first CDS circuit 21 to charge the capacitor $C_{32}$ with an electric charge Q1. When, with the switch $SW_{33}$ open, the switch $SW_{31}$ is opened and the switch $SW_{32}$ is closed for a predetermined duration, difference calculation circuit 30A receives the signal voltage output from the second CDS circuit 22 to discharge an electric charge Q2 from the capacitor $C_{32}$. In this way, the difference calculation circuit 30A stores an electric charge (Q1−Q2), the difference between the charge Q1 and the charge Q2, in the capacitor $C_{32}$ and outputs a signal voltage corresponding to the charge (Q1−Q2). The switch $SW_{31}$ is operated according to the Sample1 signal output from the timing control circuit 300. The switch $SW_{32}$ is operated according to the Sample2 signal output from the timing control circuit 300. The switch $SW_{33}$ is operated according to the Clamp3 signal output from the timing control circuit 300.

This invention is not limited to the above embodiments but may be modified in many ways. For example, rather than using the A/D converter 400, it is possible to successively output the signal voltage $V_{n3}$ from the hold circuit 40 of each unit $100_n$ as an output signal of the photo-detecting apparatus.

Further, while in the above embodiments we have explained about the photo-detecting apparatus or imaging device having two or more photodiodes, this invention can be applied to a photo-detecting apparatus with only one photodiode. In that case, only one set of photodiode PD, integrating circuit 10, first CDS circuit 21, second CDS circuit 22 and difference calculation circuit 30 (or 30A) needs to be provided and a similarly excellent S/N ratio is obtained.

Although, in the above embodiments, the maximum value of the signal voltages $V_{n3}$ output from the hold circuits 40 of the units $100_n$ is detected by the maximum value detection circuit 200, it is possible to detect the maximum value of the signal voltages output from the difference calculation circuits 30 (or 30A) of the units $100_n$ by the maximum value detection circuit 200.

As detailed above, with this invention a signal current corresponding to the incident light intensity is output from the photodetectors, and the integrating circuit integrates an electric charge corresponding to the signal current output from the photodetectors and outputs a signal voltage corresponding to the amount of integrated electric charge. The first CDS circuit receives at its first coupling capacitor the signal voltage output from the integrating circuit and stores an electric charge corresponding to a change in the received signal voltage into the first integrating capacitor by means of the first switch means. Similarly, the second CDS circuit receives at its second coupling capacitor the signal voltage output from the integrating circuit and stores an electric charge corresponding to a change in the received signal voltage into the second integrating capacitor by means of the second switch means. Then, the difference calculation circuit determines a difference between the charge stored in the first integrating capacitor of the first CDS circuit and the charge stored in the second integrating capacitor of the second CDS circuit and then outputs a signal voltage according to the difference.

Hence, if the integrating circuit has noise variations among different integration operations, the noise error is eliminated by the first and second CDS circuits. In the first period an electric charge corresponding to the spot light component (signal light component) and the background light component is stored in the first integrating capacitor of the first CDS circuit; in the second period an electric charge corresponding to the background light component is stored in the second integrating capacitor of the second CDS circuit; and in the third period a difference between these two charges is determined by the difference calculation circuit. The signal voltage output from the difference calculation circuit therefore corresponds to only the spot light component (signal light component). In this way, the light detection S/N ratio remains high even when the amount of light detected by the photodetector, i.e., the value of the signal voltage, is small.

Further, when the order of storing the electric charges in the integrating circuit has to be changed due to the light emitting timing of the light emitting means such as light emitting diode, i.e., when the first period and the second period need to be changed, the conventional technology cannot perform such a change because the circuit following the integrating circuit is fixed and allowed to operate in one polarity only. With this invention, however, the first and second CDS circuits can be controlled independently of each other and thus the charge stored in these circuits can be outputted independently. That is, this invention allows the first period and the second period to be changed easily.

There are N sets of photodetector, integrating circuit, first CDS circuit, second CDS circuit, difference calculation circuit and hold circuit. The signal voltage output from the difference calculation circuit of each set is held in the hold circuit. The A/D converter successively receives the signal voltages output from the N hold circuits, converts the signal voltages into digital signals and outputs the converted digital signals. In this case, a 1-dimensional or 2-dimensional image is detected and the detection result is output as a digital signal.

The maximum value detection circuit detects the maximum value of the signal voltages output from the N difference calculation circuits or hold circuits. In the A/D converter, if the A/D conversion range is set according to the maximum value detected by the maximum value detection circuit, the A/D conversion will not saturate even when the incident light intensity is large and will have an excellent resolution even when the incident light intensity is small.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A photo-detecting apparatus comprising:
    a photodetector to output a signal current corresponding to an incident light intensity;
    an integrating circuit to store an electric charge corresponding to the signal current output from the photodetector and output a signal voltage corresponding to the amount of stored charge;
    a first CDS circuit having a first coupling capacitor and a first amplifier both connected serially in that order between its input terminal and output terminal, the input terminal being adapted to receive the signal voltage output from the integrating circuit, a first integrating capacitor parallelly connected between an input and an output of the first amplifier, and a first switch means for storing in the first integrating capacitor an amount of electric charge corresponding to a change in the signal voltage;
    a second CDS circuit having a second coupling capacitor and a second amplifier both connected serially in that order between its input terminal and output terminal, the input terminal being adapted to receive the signal voltage output from the integrating circuit, a second integrating capacitor having a capacitance value equal to that of the first integrating capacitor and parallelly connected between an input and an output of the second amplifier, and a second switch means for storing in the second integrating capacitor an amount of electric charge corresponding to a change in the signal voltage; and
    a difference calculation circuit to determine a difference between the amounts of charges stored in the first integrating capacitor of the first CDS circuit and in the second integrating capacitor of the second CDS circuit and output a signal voltage corresponding to the difference,
    a timing control circuit for controlling the operations of the integrating circuit, the first CDS circuit, the second CDS circuit and the difference calculation circuit, the photo-detecting apparatus being used along with a light emitting means for throwing a spotlight toward an object;
    wherein the timing control circuit performs the steps of:
        in a first period when the light emitting means is throwing the spot light onto the object, storing a first amount of electric charge in the first integrating capacitor of the first CDS circuit based on the change in the signal voltage output from the integrating circuit when the photodetector detects the spotlight component and a background light component;
        in a second period when the light emitting means is not throwing the spotlight onto the object, storing a second amount of electric charge in the second integrating capacitor of the second CDS circuit based on the change in the signal voltage output from the integrating circuit when the photodetector detects the background light component; and
        in a third period following the first and second periods, having the difference calculation circuit calculate a difference between the amount of charge stored in the first integrating capacitor of the first CDS circuit and the amount of charge stored in the second integrating capacitor of the second CDS circuit and then output a signal voltage corresponding to the difference from the difference calculation circuit.

2. A photo-detecting apparatus comprising:
    a photodetector to output a signal current corresponding to an incident light intensity;
    an integrating circuit to store an electric charge corresponding to the signal current output from the photodetector and output a signal voltage corresponding to the amount of stored charge;
    a first CDS circuit having a first coupling capacitor and a first amplifier both connected serially in that order between its input terminal and output terminal, the input terminal being adapted to receive the signal voltage output from the integrating circuit, a first integrating capacitor parallelly connected between an input and an output of the first amplifier, and a first switch means for storing in the first integrating capacitor an amount of electric charge corresponding to a change in the signal voltage;
    a second CDS circuit having a second coupling capacitor and a second amplifier both connected serially in that order between its input terminal and output terminal, the input terminal being adapted to receive the signal voltage output from the integrating circuit, a second integrating capacitor having a capacitance value equal to that of the first integrating capacitor and parallelly connected between an input and an output of the second amplifier, and a second switch means for storing in the second integrating capacitor an amount of electric charge corresponding to a change in the signal voltage; and a difference calculation circuit to determine a difference between the amounts of charges stored in the first integrating capacitor of the first CDS circuit and in the second integrating capacitor of the second CDS circuit and output a signal voltage corresponding to the difference, N sets (N≧2) of the photodetector, the integrating circuit, the first CDS circuit, the second CDS circuit and the difference calculation circuit;

N hold circuits corresponding to the respective N difference calculation circuits and adapted to hold and output the signal voltages output from the difference calculation circuits; and an A/D converter to successively input the signal voltages output from the N hold circuits, convert the signal voltages into digital signals and output the converted digital signals.

3. A photo-detecting apparatus according to claim 2, further including: a maximum value detection circuit to detect a maximum value of the signal voltages output from the N difference calculation circuits or the N hold circuits;

wherein the A/D converter sets an A/D conversion range according to the maximum value detected by the maximum value detection circuit.

* * * * *